US007850886B2

(12) United States Patent
Walter

(10) Patent No.: US 7,850,886 B2
(45) Date of Patent: Dec. 14, 2010

(54) METHOD FOR THE MANUFACTURING OF A DIFFRACTION GRATING STRUCTURE ON THE SURFACE OF PHARMACEUTICAL TABLET

(75) Inventor: Harald Walter, Kilchberg (CH)

(73) Assignee: CSEM Centre Suisse d'Electronique et de Microtechnique SA- Recherche et Développement, Neuchatel (CH)

( * ) Notice: Subject to any disclaimer, the term of this patent is extended or adjusted under 35 U.S.C. 154(b) by 737 days.

(21) Appl. No.: 11/811,901

(22) Filed: Jun. 12, 2007

(65) Prior Publication Data

US 2007/0286811 A1 Dec. 13, 2007

Related U.S. Application Data

(60) Provisional application No. 60/812,968, filed on Jun. 13, 2006.

(30) Foreign Application Priority Data

Jan. 12, 2007 (CH) .................................... 0041/07

(51) Int. Cl.
*B29C 43/02* (2006.01)

(52) U.S. Cl. ...................................... 264/123; 264/109

(58) Field of Classification Search ....................... None
See application file for complete search history.

(56) References Cited

U.S. PATENT DOCUMENTS

| | | | | |
|---|---|---|---|---|
| 4,668,523 | A | 5/1987 | Begleiter | |
| 5,451,505 | A | 9/1995 | Dollinger | |
| 6,455,157 | B1 | 9/2002 | Simons | |
| 2008/0057312 | A1* | 3/2008 | Walter et al. | 428/409 |

FOREIGN PATENT DOCUMENTS

| | | |
|---|---|---|
| GB | 2343862 | 5/2000 |
| WO | WO 01/10464 A1 | 2/2001 |
| WO | WO2006/027688 | 3/2006 |
| WO | WO2006/047695 | 5/2006 |

OTHER PUBLICATIONS

Begleiter "Edible holography: the application of holographic techniques to food processing", SPIE, vol. 1461, 1991 pp. 102-109.

Marshall, K. "Tablet press fundaments," Tablets & Capsules 2005, p. 6-11.

Armstrong, N. A. "Considerations of Compression Speed in Tablet Manufacture," Pharmaceutical Technology, Sep. 1990, p. 106-114.

* cited by examiner

*Primary Examiner*—Mary Lynn F Theisen
(74) *Attorney, Agent, or Firm*—Weingarten, Schurgin, Gagnebin & Lebovici LLP

(57) ABSTRACT

A diffractive microstructure (11) is implemented as a security feature in the surface of tablet (4). For this purpose the punches (1*a*, 1*b*) comprise a microstructure (11), which during the compression process produce the diffractive microstructure on the surface of the tablet (4), by plastic and/or visco-elastic deformation of the powder particles. The method according to the invention is compatible to the existing tablet manufacturing methods with their high production speeds and compression forces. It is also compatible to the usual tabletting adjuvants.

9 Claims, 2 Drawing Sheets

METHOD FOR THE MANUFACTURING OF A DIFFRACTION GRATING STRUCTURE ON THE SURFACE OF PHARMACEUTICAL TABLET

This application claims priority to U.S. application No. 60/812,968 filed Jun. 13, 2006, and to Swiss application CH 0041/07 filed Jan. 12, 2007.

TECHNICAL FIELD

The present invention relates to a method for manufacturing tablets with an optical security feature.

STATE OF THE ART

Forgery, grey market and illegal re-imports are a problematic topic for pharmaceutical products. An increasing number of pharmaceuticals products are counterfeited. This is not only a topic in the developing countries, where the fraction of forged products in the supply chain is sometimes already above 50%. The problem is present in the industrial nations likewise, especially as pharmaceuticals are often much more expensive. For social considerations AIDS and cancer drugs are sometimes distinctly subsided in developing countries, which enhances the danger of abusive re-imports into industrial countries.

To avoid forgery and abuse, anti-counterfeiting features are sometimes applied to packages of pharmaceutical products. Holograms, optically variable inks, fluorescent dyes, special printing techniques like micro-printing, and other security features are attached to the packages by adhesive tags, or laminated to the carton, or are directly applied to the package. The main disadvantage of such labels is that they can be removed from the product or the packaging, and later be reused or analyzed. Sometimes security features are applied to the sealing foil of blister packages, with the same drawbacks.

Approaches in which forgery resistant signatures such as DNA of known sequence (U.S. Pat. No. 5,451,505), or molecules with characteristic isotopic composition, or microparticles with characteristic color layer sequence (U.S. Pat. No. 6,455,157 B1) are added to the pharmaceutical composition are very critical, as these signatures are incorporated, e.g. eaten, together with the pharmaceutical material. For this reason marketing authorities as for example the US Food and Drug Administration (FDA) have not yet approved such methods.

Some approaches of applying holograms on edible products are published. WO 01/10464 A1 discloses the coating of an edible product with a thermo-formable and embossable layer. As the addition of the layer alters the composition, as well as the production of the pharmaceutical tablet, a new marketing approval is needed. Further the heating in the thermoforming steps is critical for many active agents.

In another approach disclosed in U.S. Pat. No. 4,668,523 a polymer solution is brought into contact with a diffraction relief mold, and is and hardened upon drying. The drying step can be accelerated by heating. At the end the hardened edible polymer product possesses the diffractive relief. This method is limited to polymer solutions and is very slow. Further the heating is again critical for active agents used in pharmaceutical products. These drawbacks have prevented these techniques to enter the market.

SUMMARY OF THE INVENTION

An object of the present invention is to provide a method for the manufacturing of tablets with integrated security features, without having the need of substantially changing the composition of the tablet, without increasing the temperature during the manufacturing, and without prolonging the manufacturing process of such tablets in relation to the state of the art techniques.

In this specification the meaning of tablet shall not only be restricted to pharmaceutical tablets or pills intended to be swallowed, sucked, chewed or delisqued, but shall also include other solid pharmaceutical forms, such as e.g. suppositories, and solid products intended to be dissolved in liquids prior to incorporation. Furthermore the meaning of tablet shall also comprise nonpharmaceutical products such as e.g. candies and sweetener tablets.

These and other problems are solved by the method according to the present invention as defined in claim 1. Advantageous embodiments are given in the dependent claims.

The method according to the invention relies on the production of a diffractive micro-structure, forming a diffraction grating, on the surface of a tablet, during the compression and consolidation phase of the manufacturing process of the tablet.

For the method according to the invention, the usual temperature and pressure values, and the normal processing speeds of conventional tabletting presses can be maintained. Particularly a compression time period per tablet of less than 100 ms is sufficient. The method according to the invention is compatible with the existing and approved tablet manufacturing procedures, and thus is cost efficient.

WAYS TO IMPLEMENT THE INVENTION

The invention will now be described in detail, with reference to FIGS. 1 to 4.

FIG. 1 schematically shows the tabletting process with a tablet press.

Most tablets are manufactured by compressing a powder mixture. If powders of active and auxiliary compounds are only mixed and then directly pressed into pills, said process is called direct tabletting. This process is essentially a high-impact molding process. The powder mixture consists of particles of different sizes, the particle size distribution being critical for the tablet compressing process. An example of a typical mixture of active and auxiliary compounds and a typical particle size distribution is shown in table 1 and 2, respectively.

TABLE 1

| Fraction [% w/w] | compound |
|---|---|
| 72.75 | Lactose Monohydrate |
| 24.25 | Microcrystalline Cellulose |
| 1.00 | Aerosil (colloidal silica, anhydrous) |
| 1.00 | Magnesium Stearate |
| 1.00 | Sodium Salicylate (exemplary active agent) |

TABLE 2

| Particle diameter [μm] | Fraction [% w/w] |
|---|---|
| <75 | 15-25 |
| 75-150 | 30-50 |
| 150-250 | 15-25 |
| 250-500 | 5-15 |
| >500 | <2 |

Lactose and Cellulose are the most widely used binding and filling agents in direct tabletting processes. These compounds are especially suited to emboss a diffractive micro-structure in them. Aerosil improves the powder flow. Magnesium Stearate is used as a lubricant. Sometimes decomposition agents are added to the powder mixture to enhance the decomposition of the incorporated tablet. Typically the decomposition time of tablets is measured in water at 37° C.

Figure 1:
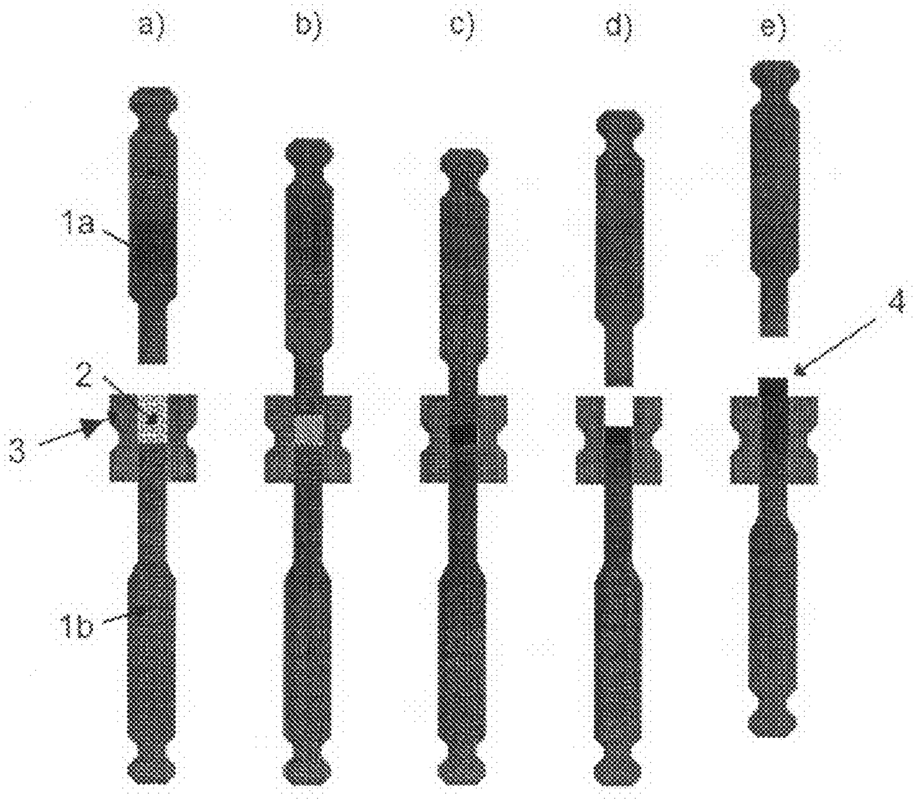

FIG. 1 schematically shows the manufacturing process of a tablet. Powder 2, a mixture of powder compounds, is brought into a die 3. Two axially aligned punch tools 1*a*, 1*b* produce an axial mechanical pressure force, forming the tablet.

The powder mixture 2 fills the cavity of the die 3, which is closed at one end by the lower punch 1*b* (FIG. 1(*a*)). The volume of the die 3 defines the amount of powder mixture 2, which is compressed to the tablet 4. This volume can be adjusted by the position of the lower punch 1*b* during the filling of the cavity. Typically the compression force is in the range of 5-25 kN. Maximum compression forces of currently available rotary tablet presses reach up to about 160 kN.

During pressing a tablet, two interrelated phenomena take place simultaneously, compression and consolidation (K. Marshall, "Tablet press fundaments", Tablets & Capsules 2005, p. 6-11). Compression leads to reduction in volume of the powder, consolidation leads to an increase in the mechanical strength of the resulting solid. When the pressure load is applied, first the volume of the powder decreases due to displacement of the air between the particles (FIG. 1(*b*)). This phase is called the repacking phase, and is limited by the attainment of the closest possible particle packing arrangement and/or friction at the particle contact points. After that point most materials begin to undergo elastic deformation until they reach their elastic limit (FIG. 1(*c*)). This phase is called the yield stress phase. Beyond that phase, the components may undergo plastic and/or visco-elastic deformation. Volume reduction may also cause particles to undergo brittle fracture. The diffractive micro-structure is mainly implemented in the tablet surface by plastic and/or visco-elastic deformation. Many materials used in tablet pressing, including some of the polymers used as binders, exhibit visco-elastic behavior. Improvements in the plasticity of a powder can be achieved by coating the particle surface with a plastic material. For example particles may be partially coated with a binding agent like Poly vinyl pyrrolidone (PVP), e.g. in wet granulation, which improves the compressibility of the particles.

The mechanical strength of the tabletting mass is increased with increasing applied pressure load due to particle-particle interactions. In particle-particle interactions, bonds form at particle surfaces as the number of contact points increases. Depending on the chemical composition the bonds are ionic or covalent bonds, dipole-dipole interactions, or van-der-Waals forces. Often a mixture of these bonds is present.

Furthermore solidification of liquid films can take place, in two ways: First, when frictional heat at the contact points causes a low-melting-point compound to soften or melt, relieving the stress at that location, the compound subsequently re-solidifies, forming a fusion bond. Second, a compound may dissolve at high-stress contact points in a film of liquid present on the surface of another particle. Again mechanical stress is relieved, and the material re-crystallizes to form a bond. If the solidification takes place close to the surface of the micro-structured punch or die, the softened, melted or dissolved compound supports the replication of the diffractive micro-structure in the surface of a particle.

At the end of the tablet press process the pressure load is removed (FIG. 1(*d*)) and the finished tablet is ejected (FIG. 1(*e*)). The following elastic recovery must be kept low to achieve a high mechanical stability of the tablet. This can be achieved by optimizing the formulation.

The micro-structured tablets can be coated with an additional layer, without destroying the diffractive effect, as long as the layer is transparent in the visible spectral range, and has an index of refraction that is different to the index of refraction of the material bearing the micro-structure.

For tablets with diffractive micro-structures in the surface the optimized composition must meet all the demands of the tablet manufacturing process, and still providing enough plastic deformability to allow the implementation of the micro-structure.

The transport of the powder mixture in the tablet presses is done by gravity. Thus a good trickle behavior of the powder is mandatory. For this purpose aerosil is used, which improves the powder flux. Magnesium stearate is used as a lubricating agent. Lubricants work by dispersing over the surface of the powder. They decrease frictional forces between the powder and tooling. Sometimes a colorant is added, but only a few colorants are approved for the use in pharmaceutical products. Most of the pharmaceutical tablets possess a white color, although some are bright red or blue. Thus all pharmaceutical tablets manufactured in the direct tabletting process possess a bright and/or light scattering surface.

Critical for the compressing process are particles which are larger than 500 μm and smaller than 75 μm. The former lower the mechanical stability of the compressed tablet, the latter are problematic for the particle flux during the filling of the cavity of the tabletting tool. Thus the fraction of these particles must be kept low as low as possible. Altogether it can be stated that almost all particles of powders used in the tablet compressing process are distinctly larger than the diffractive micro-structures to be implemented in the tablet surface. Said diffractive micro-structures are typically smaller than 5 μm.

To avoid any unwanted changes in the chemical composition of the tablet during the manufacturing method according to the invention, the temperature should preferably remain below 50° C., more preferably below 40° C. Most preferably the temperature is between about 15° C. and about 35° C.

The diffractive micro-structure to be implemented in the tablet is arranged either on the surface of the punches 1*a*, 1*b* and/or on the inner wall of the die 3. If the inner wall of the die 3 is micro-structured with linear diffractive gratings the orientation of the grating lines is advantageously parallel to the moving direction of the punches 1*a*, 1*b*, in order to assist the ejection of the finished tablet 4. With respect to the mechanical stress present in the compression process, however, the easier approach is to add the micro-structures to one or both of the punches.

Modern industrial tablet presses are high-performance machines, able to produce pharmaceutical tablets at very high speed. The production speed of state of the art single rotary presses is about 30,000 to 300,000 tablets per hour. Furthermore they must provide extreme reliability and accuracy, as all tablets have to fulfill very strict specifications regarding dimensions, weight, hardness and shape. The machines and all their parts must be in conformity with GMP (Good Manufacturing Process) and FDA regulations.

Exemplary speed-related data for different tablet presses are listed in table 3. More details can be found in N. A. Armstrong, "Considerations of Compression Speed in Tablet Manufacture", Pharmaceutical Technology, September 1990, p. 106-114. The very short compression time periods are long enough to compress the raw powder material to a hard tablet.

TABLE 3

| Press type | Production capacity per die | Descend time for the last 5 mm | Dwell time |
|---|---|---|---|
| Eccentric | 85 Tabl./min. | 68.6 ms | 0 ms |
| Small rotary | 44 Tabl./min. | 61.4 ms | 10.84 ms |
| Large rotary | 100 Tabl./min. | 26.7 ms | 3.94 ms |
| Large rotary | 121 Tabl./min. | 19.1 ms | 3.16 ms |

The descend time plus the dwell time is in the same order or less than the time used to hot-emboss diffractive micro-structures in polymer foils in roll-to-roll (R2R) processes. Such R2R processes are e.g. used to manufacture holograms for banknote security, and work with polymer web feed speeds of about 100 m/min. The polymeric substrate and process parameters like the temperature are optimized for a good replication of the micro-structure.

In analogy the pressing process in the method according to the invention has to be adapted to the requirements of the micro-structuring. Most pharmaceutical tablets possess a round shape. This eases the production process as the punches have rotational symmetry, and can freely rotate during the compression process. For the implementation of the diffractive micro-structure, however, it is advantageous to fix the punches against rotation in order to reduce shear forces, especially during the release of the tablet from the punch. As the top punch moves away from the upper surface of the tablet, elastic recovery of the tablet may keep the tablet and punch surface in contact for a short time. For tablets without circular shape, like e.g. rhomboid, rectangular, or triangular shapes, this rotational fixation is already mandatory.

The composition of the powder mixture may be optimized too. As already mentioned the compressed powders consist of a mixture of several compounds with different functions. The formulation must be chosen to provide a fraction of plastically deformable materials that is as high as possible, while still fulfilling the requirements of the end product and of the marketing authorities. E.g. the fraction of microcrystalline cellulose or plastic binders like PVP may be enhanced, or these materials can be used instead of similar, but less plastically deformable compounds.

Figure 2:
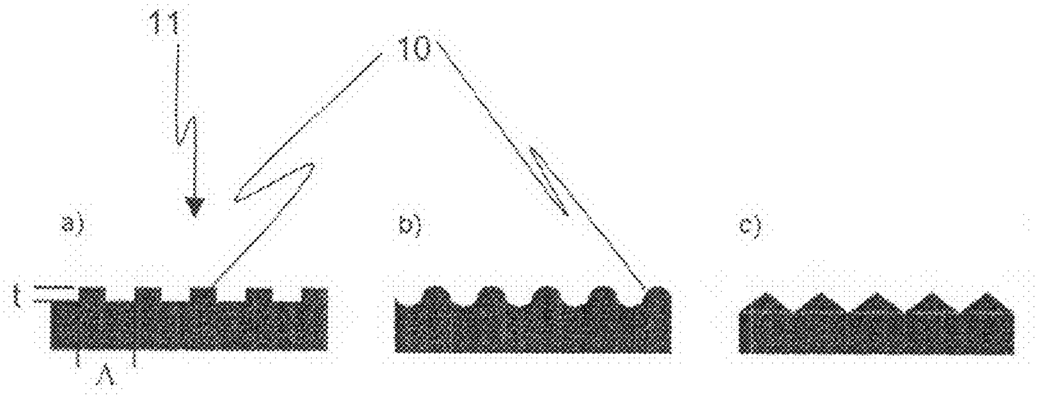
FIG. 2 shows schematic cross-sections of diffractive micro-structures on the surface of a tablet, produced by the method according to the invention, with grating lines with (a) rectangular, (b) sinusoidal, and (c) triangular shape.

Also the microstructure can be optimized in view of the requirements of the tablet pressing process. The reliable and durable application of typical diffractive micro-structures with a period Λ of about 1 μm and a depth t in the order of 300 nm, as for example shown in FIG. 2, on the surface of a tablet during a direct tabletting process is difficult. The pharmaceutical powder mixtures are not intended to be micro-structured, and the dimensions of the micro-structure are much smaller than the size of the powder particles. Therefore the surface of the particles itself must be micro-structured. And finally the time available for the micro-structuring is very short, because of the high speed of the manufacturing process. For this reason the diffractive micro-structure on the punch surface has to be optimized.

First of all the material of the tool which bears the micro-structure must be very hard to provide for a long life time. At the same time it must be possible to implement the micro-structure in the surface. E.g. hardened steel, hard chromium coated steel, tungsten carbide or molybdenum carbide can be micro-structured by ion etching. All these materials are FDA approved, and can be used for the punches and dies.

The micro-structuring increases the surface of the punches, and thus also the contact area between the punch and the compressed tablet. This leads to increased adhesion, and therefore a hampered release of the finished tablet. To minimize this effect, the micro-structure should preferably have a rounded or triangular shape, e.g. sinusoidal gratings (FIG. 2(*b*), (*c*)). Less preferable are microstructures with perpendicular walls of the grating lines, as for example in FIG. 2(*a*). In addition the depth t of the microstructures should be as low as possible. For a visible diffraction effect, however, a minimum depth t of about 80 nm is needed. The diffraction efficiency of a sinusoidal grating is e.g. maximum at a depth t of the grating being equal to 0.3-0.4 times the value of the grating period Λ.

Further the micro-structure must be deeper than the lubricant barrier layer between the punch or die wall surface and the tablet mass. Most lubricants have a laminar structure with slip planes that move easily parallel to the surface of the punch or die. Thus a micro-structure which is implemented only in this lubricant layer will be easily destroyed.

EXAMPLE

Figure 3:
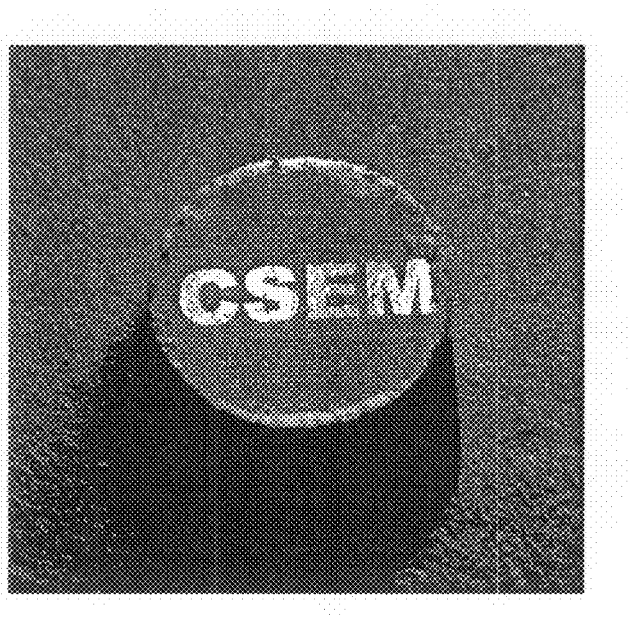
FIG. 3 shows a photograph of a tablet, manufactured with the method according to the invention.
Figure 4:
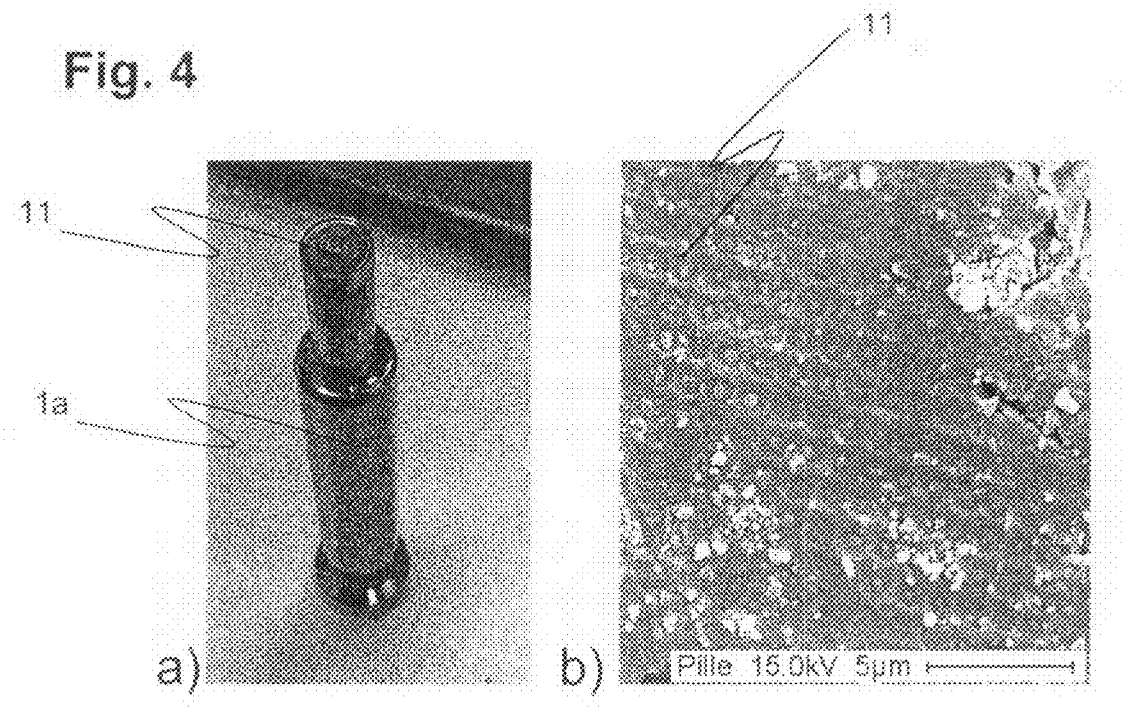
FIG. 4 shows (a) a photograph of a micro-structured tablet pressing tool, for the use in a method according to the invention, and (b) a SEM-picture (SEM=Scanning Electron Microscope) of the surface of a tablet manufactured with the method according to the invention.

Pharmaceutical tablets with a diffractive micro-structure were produced with a manufacturing method according to the invention. A powder mixture as described in table 1 was compressed to tablets in a single rotary tablet press (Type 1200i, Company Fette, Germany) with 24 punch pairs. The punches had a diameter of 11.8 mm and a hard chromium coated surface. In the hard chromium surface a diffractive micro-structure with a period of 1.4 μm and a depth of about 500 nm was ion etched (see FIG. 4(*a*)). Visible diffractive effects in tablets with a weight of 540 mg were obtained with a compacting force of 25 kN and a production speed of 30,000 tablets per hour. FIG. 3 shows one of the manufactured tablets. Of course the produced diffraction effects cannot be reproduced in the black-and white photograph of FIG. 3. However, the diffractive micro-structure produces clearly readable letters "CSEM". The hardness of the pill was 154 N which is a reasonable value with respect to a good dissolvability of the pill. A SEM image of the micro-structured surface of such a tablet is shown in FIG. 4(*b*). The diffractive micro-structure is clearly visible.

LIST OF REFERENCE SYMBOLS

1*a*, 1*b* Punch tool
2 Powder mixture
3 Die
4 Tablet
10 Grating line
11 Grating microstructure
Λ Period
t depth

The invention claimed is:

1. A method for the manufacturing of tablets with an optical security feature from a powder mixture, using a tablet press comprising a die and two punches, wherein the surface of at least one of said die or at least one of said two punches faces said powder mixture and is provided with an embossing relief in the form of a diffractive micro-structure that is smaller than 5 μm and having a grating relief, said diffractive micro-structure that produces recognizable diffraction effects in the optical spectral range, said method comprising the steps:

compressing the powder mixture to a tablet by employing said die and said two punches to obtain a compressed tablet;

reproducing said diffractive micro-structure on at least a part of the surface of said compressed tablet, wherein said diffractive micro-structure is reproduced on the surface of said particles of said powder mixture, wherein the temperature of said tablet and of the ambient during the step of compressing is in the range of 15° C. to 50° C.; and ejecting said compressed tablet from said two punches.

2. The method according to claim 1, wherein the combined duration of both the steps of compressing and reproducing is shorter than 100 ms.

3. The method according to claim 1, wherein said grating relief has at least one of a substantially sinusoidal and triangular shape.

4. The method according to claim 3, wherein said grating relief comprises grating lines and has a depth t between neighboring grating lines, and wherein said depth t is minimum 80 nm.

5. The method according to claim 3, wherein said depth t of said grating relief is between 0.3 and 0.4 times the value of the grating period Λ of said diffractive micro-structure.

6. The method according to claim 1, wherein said two punches are rotationally fixed in relation to their longitudinal axis during said step of compressing and reproducing.

7. The method according to claim 1, further comprising after said step of ejecting said compressed tablet, the step of coating said compressed tablets with a coating that is transparent in the visible spectral range, and which has an index of refraction that is different from the index of refraction of said powder mixture.

8. The method according to claim 1, carried out with a rotary tablet press.

9. The method according to claim 1, wherein said steps of compressing the powder mixture to a tablet and reproducing said diffractive micro-structure on at least a part of the surface of said compressed tablet is performed by applying a compression force that is in the range of 5 to 25 kN.

* * * * *

UNITED STATES PATENT AND TRADEMARK OFFICE

CERTIFICATE OF CORRECTION

PATENT NO. : 7,850,886 B2
APPLICATION NO. : 11/811901
DATED : December 14, 2010
INVENTOR(S) : Harald Walter It is certified that error appears in the above-identified patent and that said Letters Patent is hereby corrected as shown below:

Title page, (54) Title, “METHOD FOR THE MANUFACTURING OF A DIFFRACTION GRATING STRUCTURE ON THE SURFACE OF PHARMACEUTICAL TABLET” should read:

-- METHOD FOR THE MANUFACTURING OF A DIFFRACTION GRATING STRUCTURE ON THE SURFACE OF A PHARMACEUTICAL TABLET --; and Column 1, lines 1-4, “METHOD FOR THE MANUFACTURING OF A DIFFRACTION GRATING STRUCTURE ON THE SURFACE OF PHARMACEUTICAL TABLET” should read:

-- METHOD FOR THE MANUFACTURING OF A DIFFRACTION GRATING STRUCTURE ON THE SURFACE OF A PHARMACEUTICAL TABLET --.

Signed and Sealed this
Eighteenth Day of October, 2011

David J. Kappos
*Director of the United States Patent and Trademark Office*